June 1, 1937.  J. B. GETZ ET AL  2,082,388
MACHINERY FOR MAKING WIRE FENCING
Filed Jan. 2, 1937  10 Sheets-Sheet 1
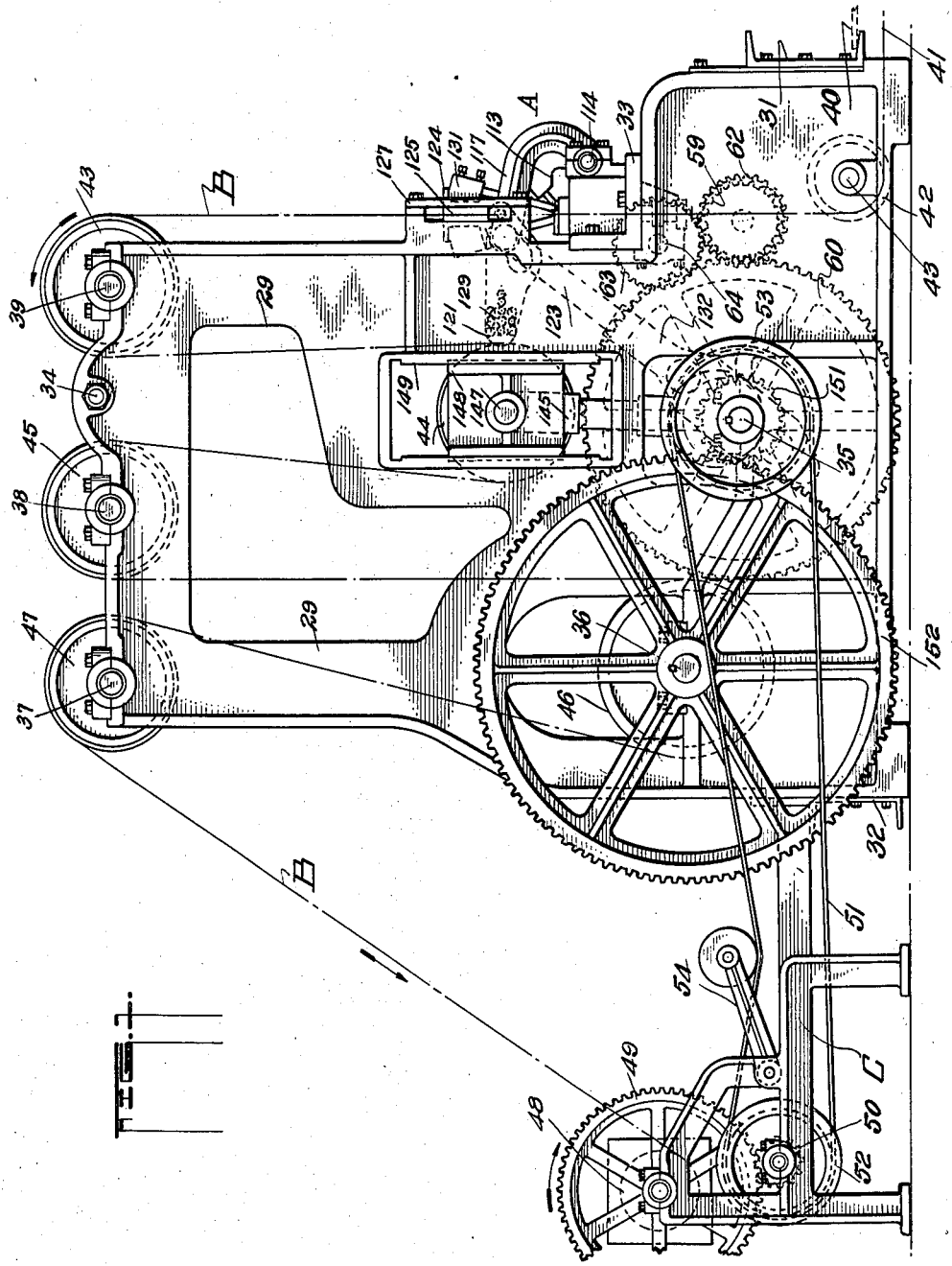

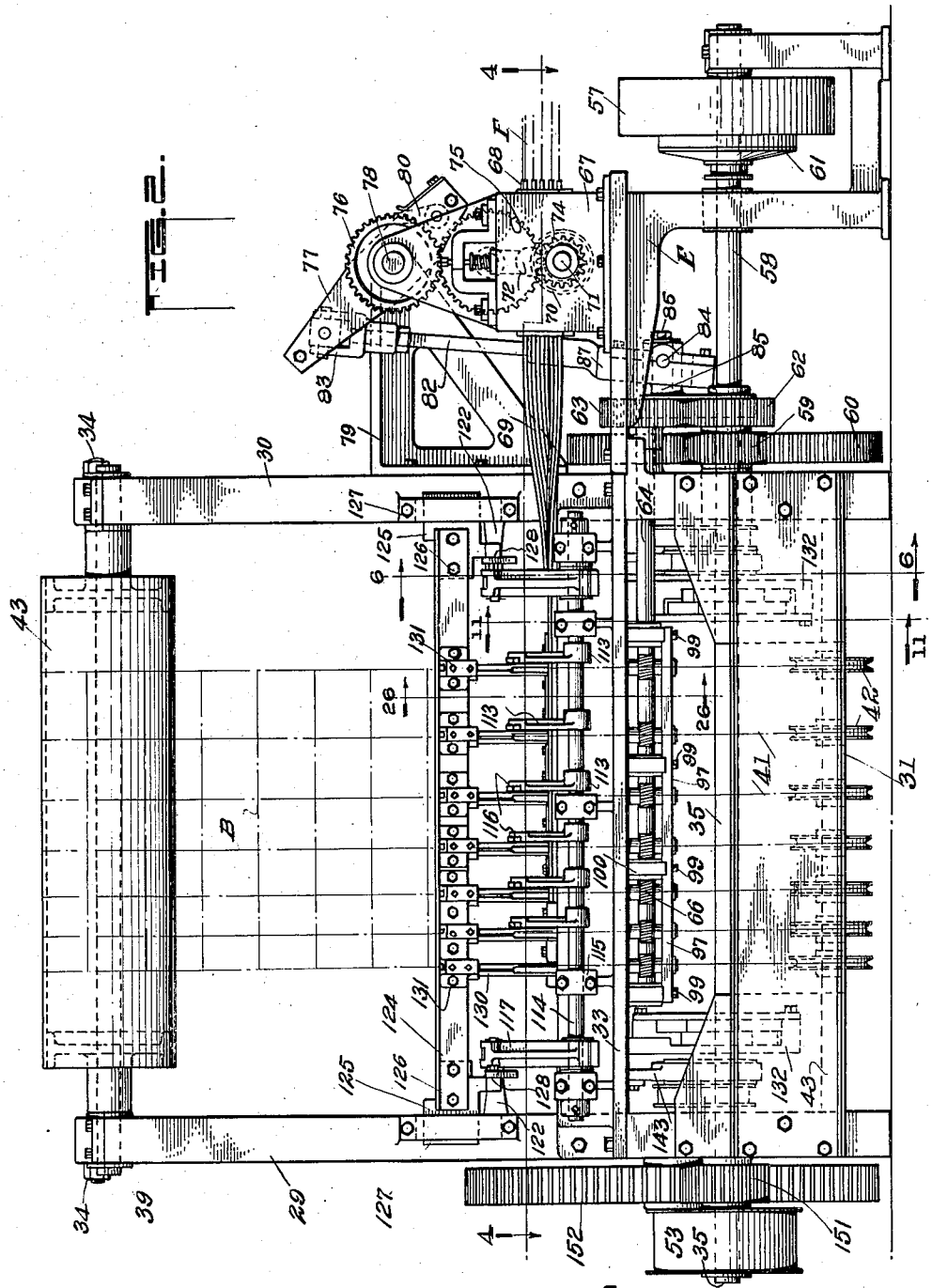

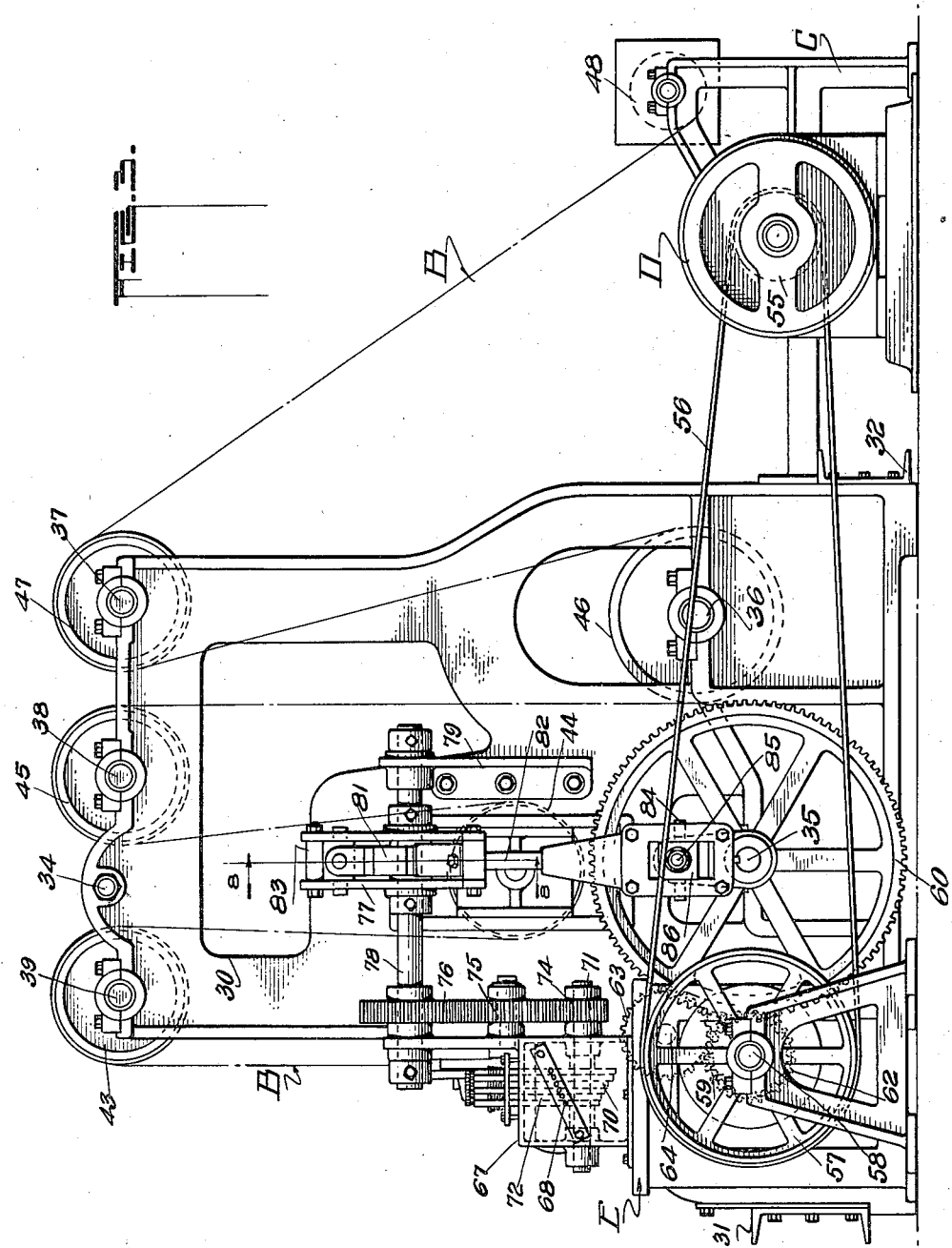

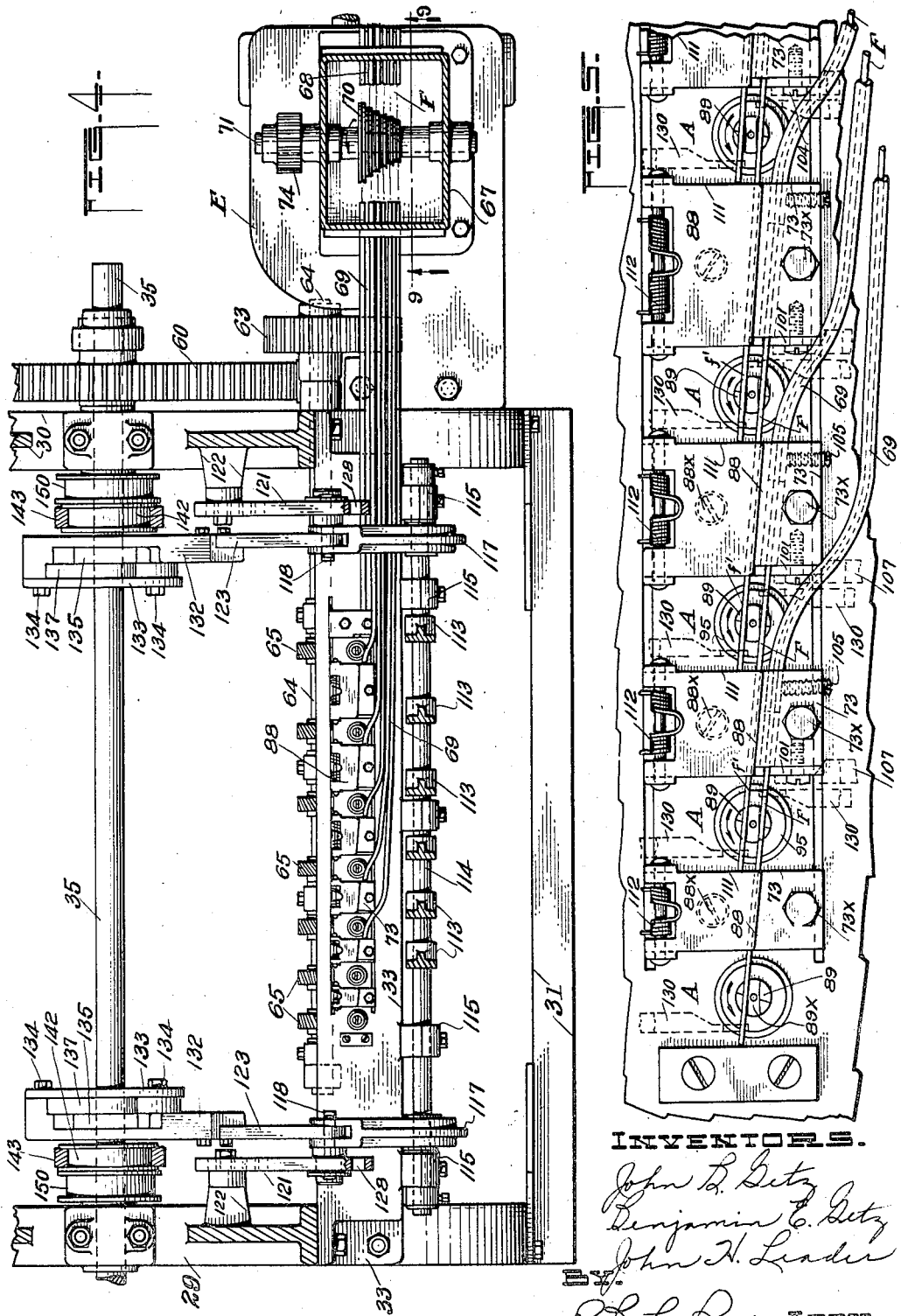

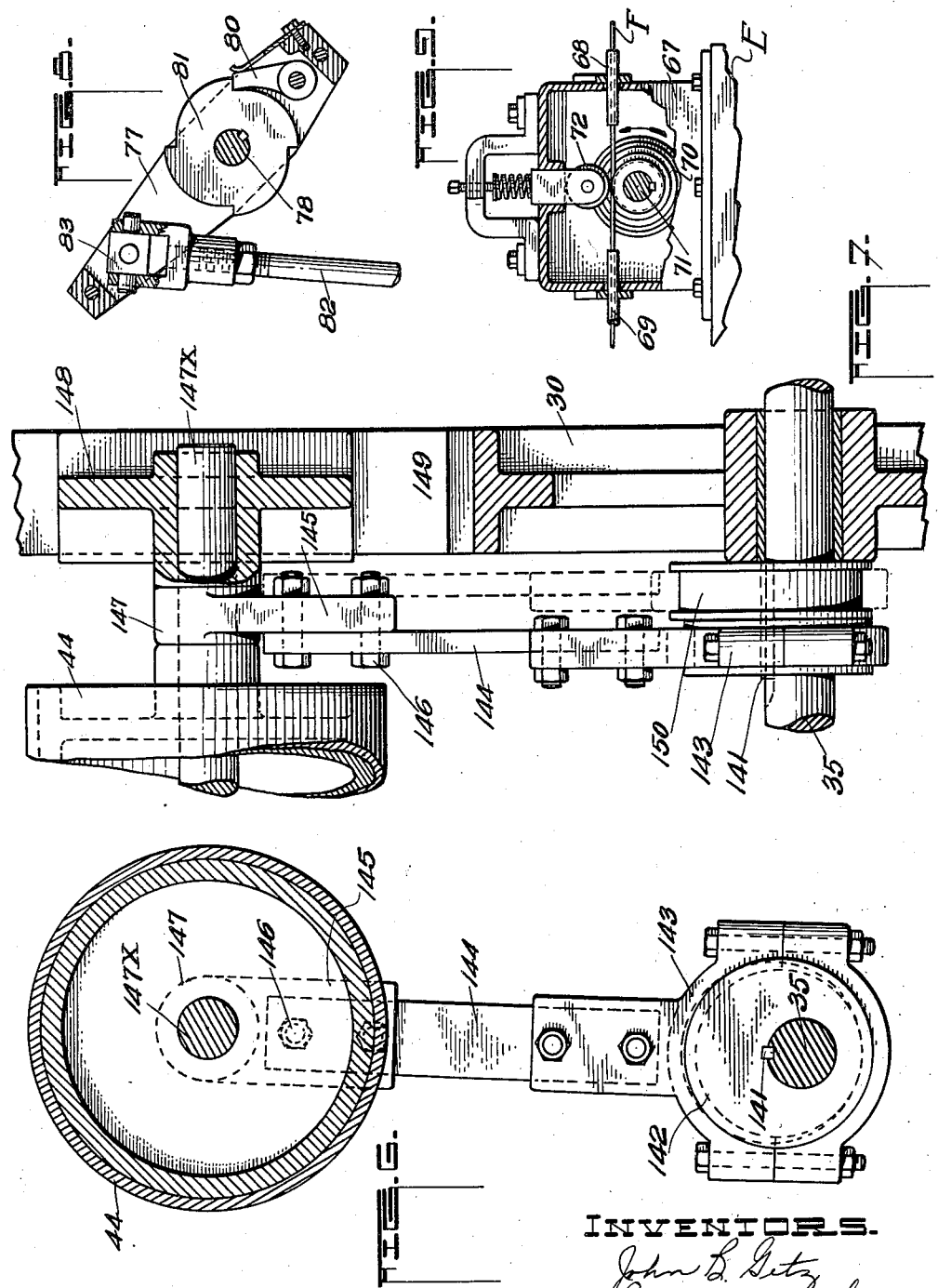

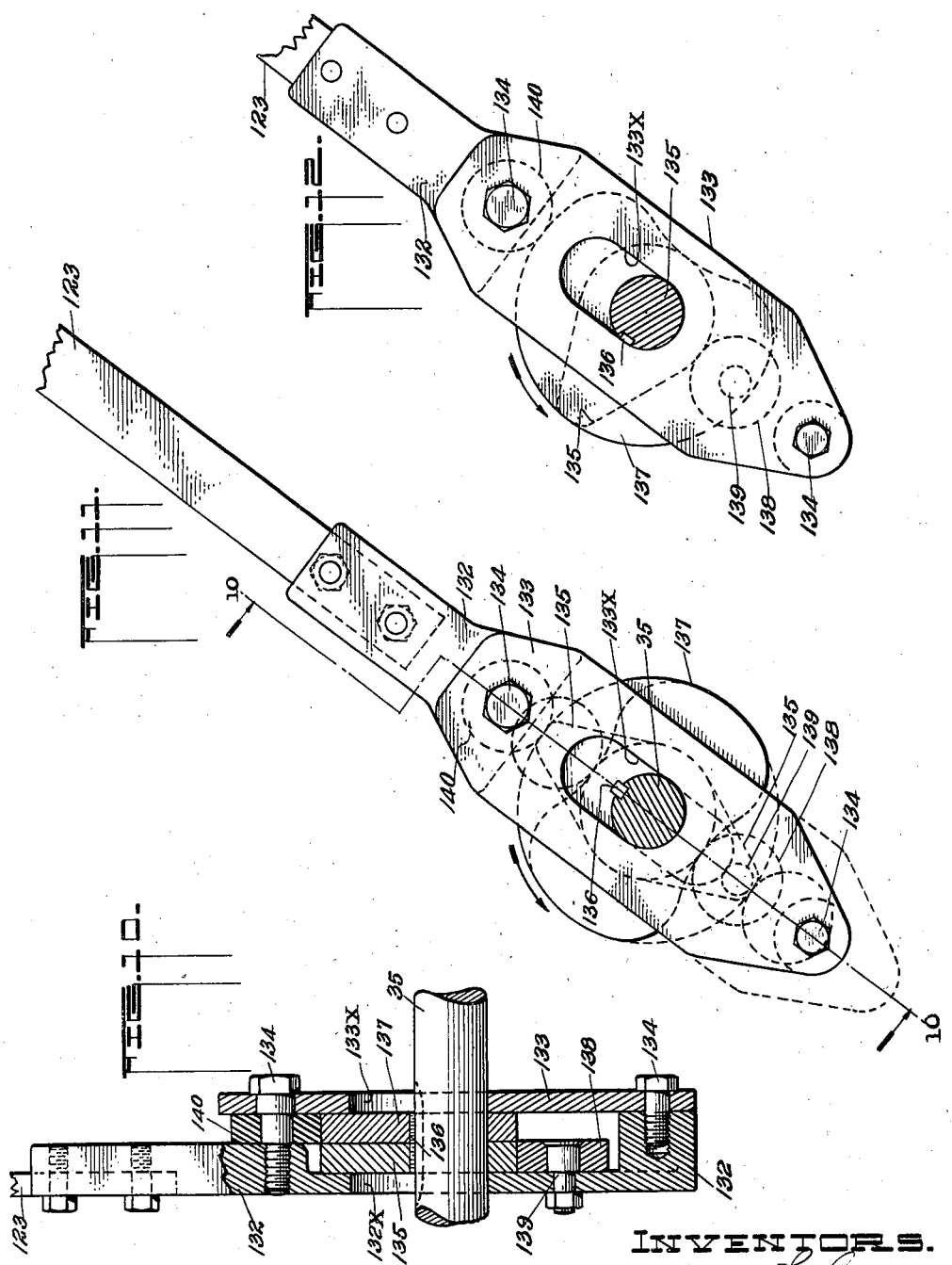

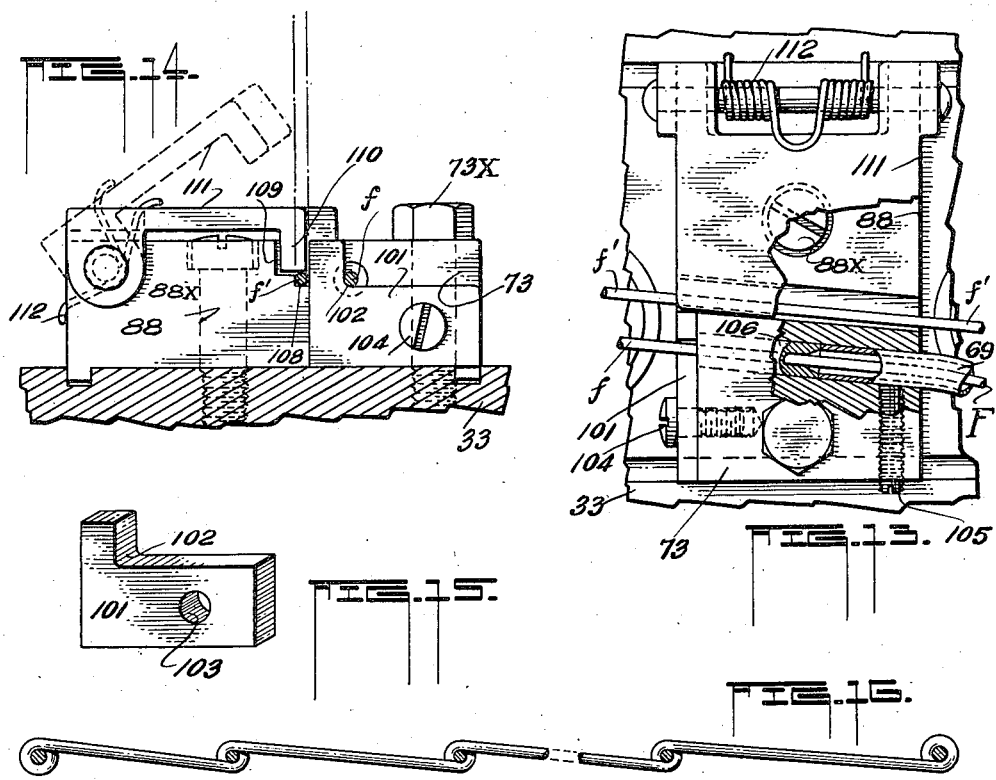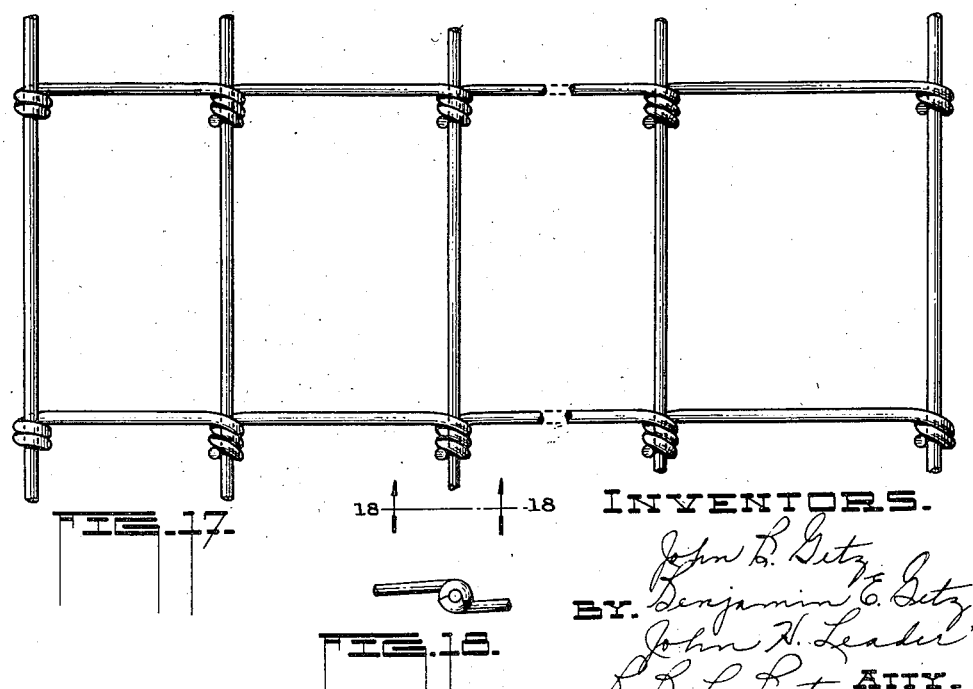

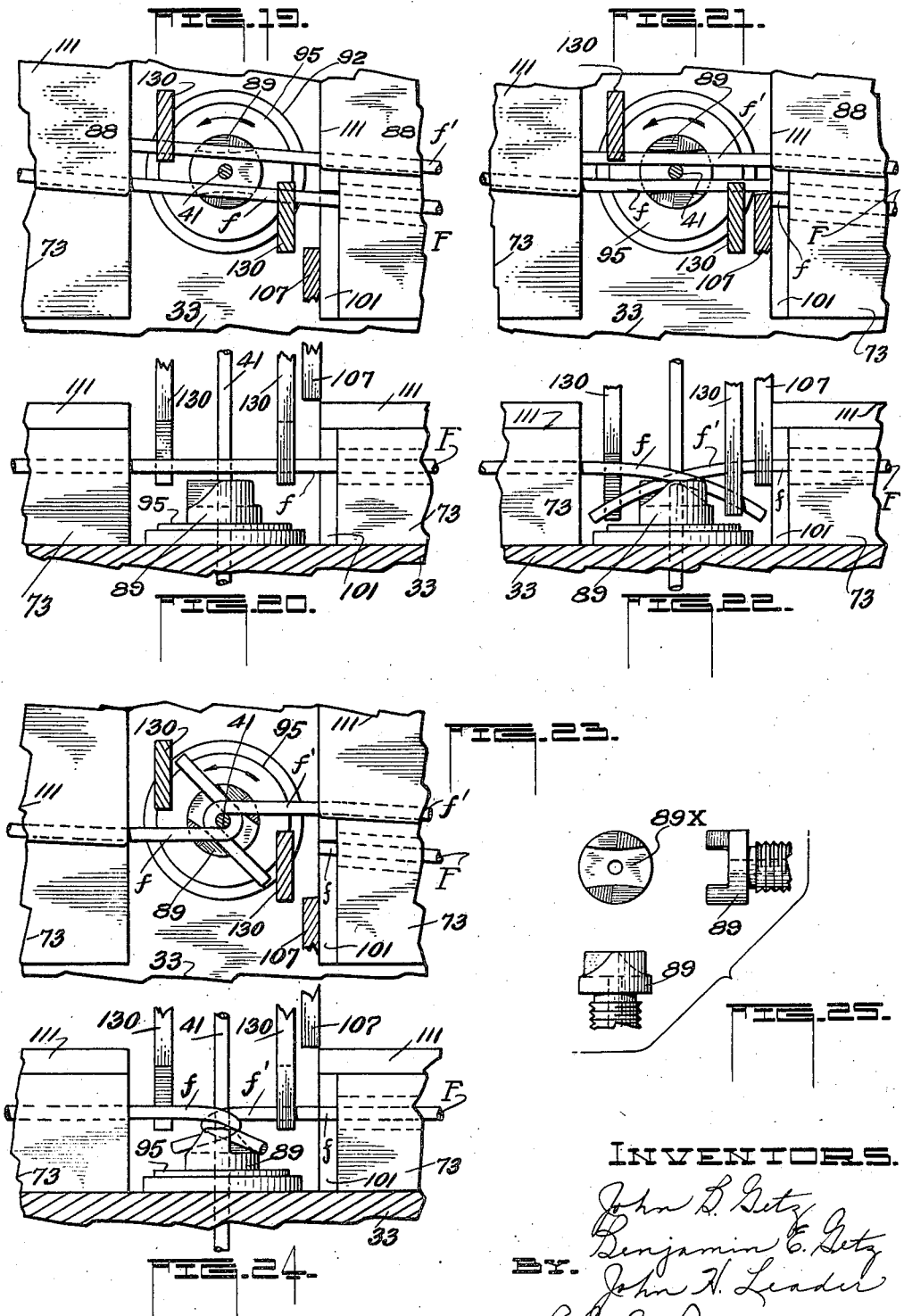

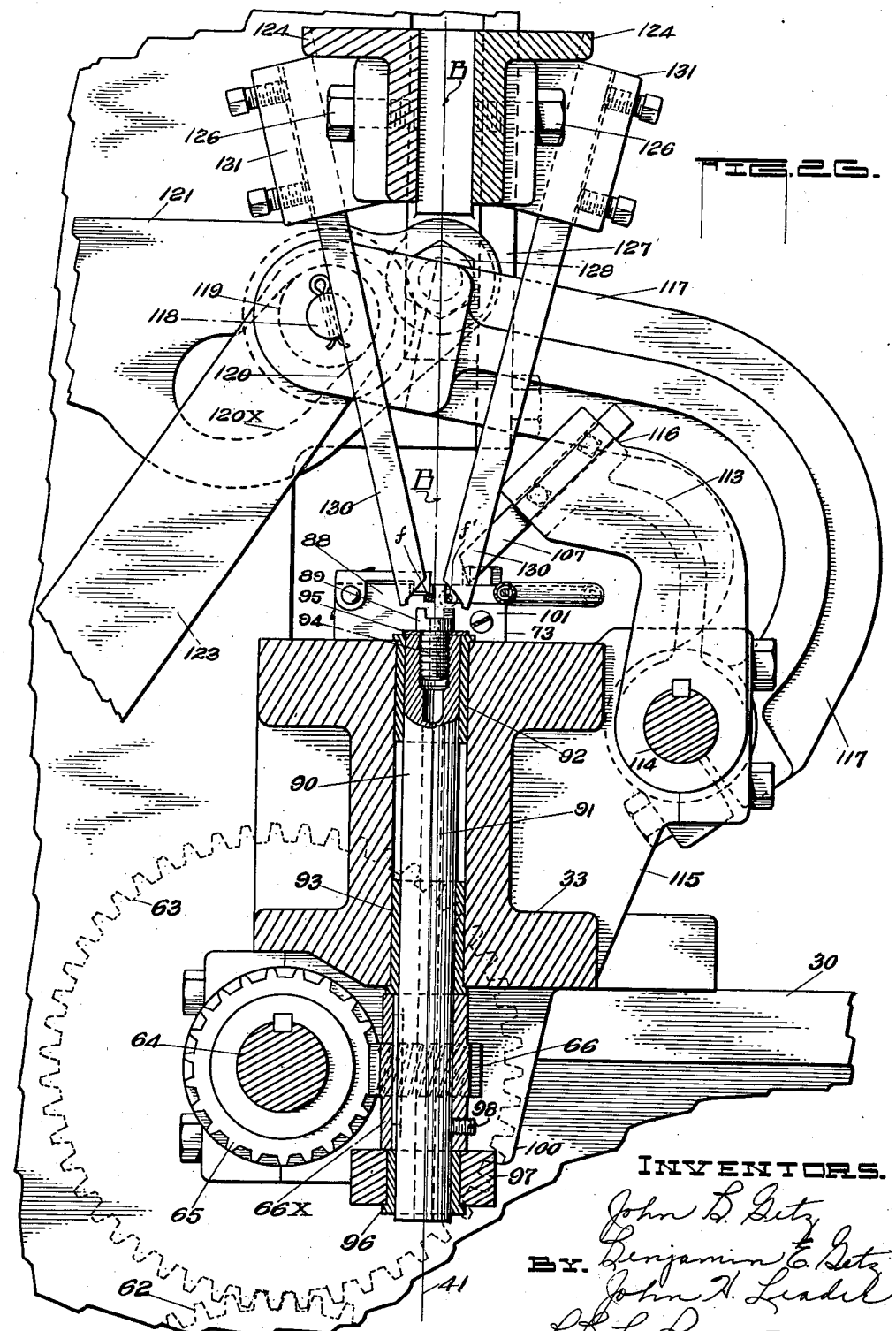

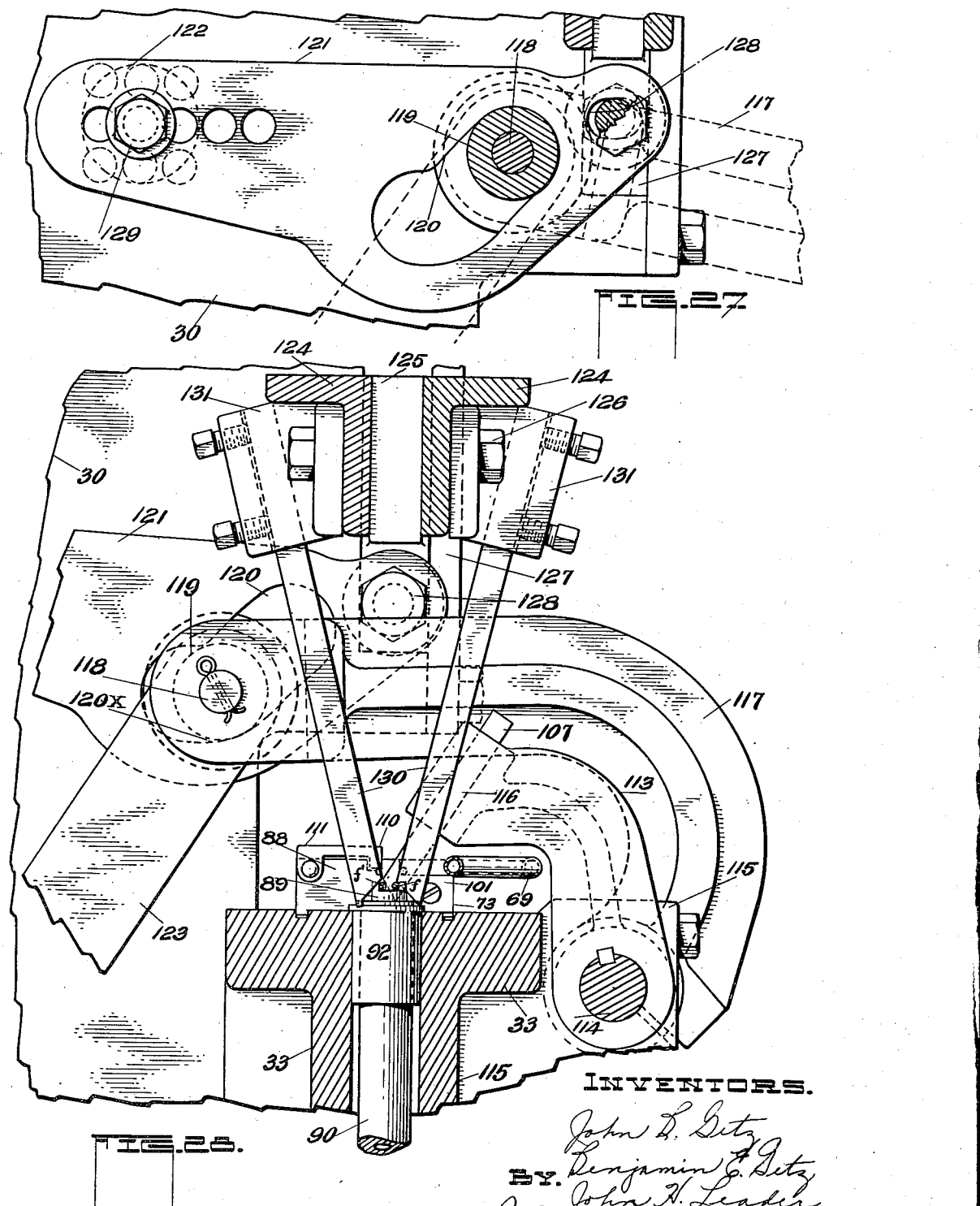

Patented June 1, 1937

2,082,388

UNITED STATES PATENT OFFICE 2,082,388

MACHINERY FOR MAKING WIRE FENCING

John B. Getz, Benjamin E. Getz, and John H. Leader, Morton, Ill.; said Leader assignor to said John B. Getz and to said Benjamin E. Getz Application January 2, 1937, Serial No. 118,754

60 Claims. (Cl. 140—13)

Our invention relates to improvements in machinery for making wire fencing. More particularly, the invention has relation to the production of wire fencing commonly known in the art as the hinged type; that is, a fencing comprising, preferably, continuous line wires or strands spaced at appropriate distances apart, connected together by cross stays or tie wires twisted around the line or strand wires, and also desirably twisted together, whereby to flex or hinge with reference to adjacent stay wires and any given strand wire immediately associated with the adjoining ends of the stay wire.

Heretofore, in the art dealing with the particular type of fencing just referred to, many attempts have been made to provide machines capable of producing the same, attended by more or less success. However, having in mind the delicacy of operation involved in positioning and securing the strands and stays together, accuracy, speed, and efficiency must attend the operation, to render the machine economically successful; and to render the machine as simple as possible in parts, construction, and operation, the present invention has been designed to improve and perfect wire fencing machines in all of these respects.

Owing to the length of the strand or line wire of the fencing, there has always existed a tendency of the same to angularly bend or displace themselves or be thus displaced by the arrangement of the mechanical parts of the machine, or by vibration, with reference to what may be styled the "twisting stations" and devices, interfering with and adding to the difficulties of rapid twisting operations. To overcome this characteristic disadvantage of existing machines, a novel feature of our present improvements may be said to reside in such a relationship of the twisting devices with regard to the movement of the strand or line wires that during and after the twisting operations the fence fabric will be forced or drawn in a rectilineal path away from the twisting devices; that is, in a path substantially truly aligned vertically, but with the delivery of the line wires or strands to and through the twisting devices such that the fabric may not incline, sag, or bend, with possible attending vibrations of the line or strand wires at the twisting stations, where it is most desirable that a temporarily fixed and accurate relationship of the line or strand wires be maintained with reference to the cross or tie or stay wires being wrapped or coiled or otherwise connected therewith.

In addition to the foregoing consideration, the present invention presents a novel arrangement of means for more positively positioning and maintaining preliminary relationship between the line wires or strands and the relatively transverse wires to constitute the ties or stays to better insure the accurate and satisfactory twisting of the several wires into ultimate hinged, connected or fabricated form.

This invention more specifically embraces means of relatively simplified character, whereby the tie or stay wires may be cut, as desired, and/or pressure, deflecting, or positioning members may be operated to insure correct relationship of the ends of the tie or stay wires relatively to each other and relatively to the line or strand wires, to better insure the twisting of the tie or stay wires together and with the complemental strand or line wire,—all, preferably, through the instrumentality of a single actuating medium, wherein the positioning or pressure members will possess a unitary straight course of movement, as distinguished from prior art devices wherein the presser or guide members have been independently mounted on pivot devices or the like, with the hazards or disarrangement relative to looseness or other impairment of a perfect coordination in arrangement and functioning.

Another novel improvement afforded by the present invention flows from the provision of a detachable hardened metal shear plate associated with a suitable cutter for the tie or stay wires, arranged in readily accessible position for inspection, repair or replacement, as may be required.

Another novel feature has to do with the feed mechanism for the line or strand wires, in association with the wrapping mechanism, for drawing the completed fence fabric from the machine, in combination with aligned idler rolls over which the fabric passes in its course through the machine, and a compensating pull-up roll movable in the general direction of the travel of said fabric, to enable continuous winding at the rear end of the machine while permitting the lull in the travel of the fabric in the forepart of the machine during the tie or stay wire feeding and twisting operations,— all to the end that minimum interference or strain is offered to the passage of the fabric from the intake to the output ends of the machine.

The invention also embraces improved timing mechanism including a timing shaft, connecting devices intermediate of the same, and various operating devices in the mechanism to insure such timing movements and correlation of moving parts, as will render the machine smooth and synchronously operative throughout; including connecting instrumentalities between the timing shaft and an intermittent feed mechanism for the stay or tie wires between said shaft and the cutting and pressing or guiding members for the wire ends to be twisted, between said shaft and the twisting devices, between said shaft and the cutting mechanism for the stay or tie wires, between said shaft and the compensating pull-up means, and between said shaft and a crimping device and a wrapping means, as will more fully hereinafter appear.

Ancillary features of novelty comprise specific and special characteristics of the intermittent feed for the stay or tie wires enabling conversion of rotary movement, as of the timing shaft to an oscillating movement of a step-by-step pawl-and-ratchet control for the feeding of said stay wires; also in the special construction of cam mechanism for raising and lowering the compensating or pull-up roll or drum, whereby the extent of movement of the drum may be varied by adjustment of the cam mechanism, for example, into either one of two positions to regulate the throw of the immediate two connecting means running from the said drum to the camming devices secured to and rotating with the timing shaft or some equivalent driving shaft; special provision of adjusting means for the actuating means controlling the normal positioning and throw of the cutter and/or pressing and guiding means lending to the initial assembly of the parts in most effective cooperative association; and improved compound cam mechanism for effecting rapidly successive thrusts of the cutter and pressure or guiding members for the ends of the stay or tie wires relative to the twisting devices and corresponding rapid retraction of the cutter and pressing or guiding members following the performance of their respective functions.

Still other improved features and combinations of devices in our improved machine will be apparent from the detail description hereinafter contained and as will appear to persons skilled in the art to which the invention relates, reference being now made to said description taken in connection with the accompanying drawings forming a part hereof and wherein the preferred embodiment of the invention is illustrated for the purpose of aiding an understanding of one such mechanism for carrying the invention into practical effect.

In the drawings:

Figure 1 is a side view of the machine;

Figure 2 is a front view of the same;

Figure 3 is also a side view of the machine, viewing the same from a direction opposite that of Figure 1;

Figure 4 is a horizontal sectional view, looking downwardly with respect to the machine and taken on the line 4—4 of Figure 2, certain parts being shown in elevation and other parts broken away;

Figure 5 is a fragmentary top plan view, looking downwardly upon some of the series of stay or tie wire guide blocks, corresponding feed tubes and immediately associated elements of construction;

Figure 6 is a vertical sectional view taken on the line 6—6 of Figure 2 to illustrate the compensating or pull-up roll or drum and actuating means therefor, as seen from a point looking in the direction of the arrows designated in Figure 2;

Figure 7 is a view partly in elevation and partly in section, viewing the same construction illustrated in Figure 6 at right angles to Figure 2, and also illustrating the timing shaft and the vertical driveway for a guide member at the end of the shaft of the pull-up drum, and also an alternative arrangement of the connecting element or pitman between the pull-up drum and the cam or eccentric device on the timing shaft;

Figure 8 is a detail sectional view taken on the vertical line 8—8 of Figure 3 and looking in the direction of the arrows designating the same in said Figure 3, to illustrate in detail the pawl-and-ratchet feed mechanism and immediate actuating connection therefor, for effecting the intermittent feed of the wires from which the cross or stay wires are eventually formed and secured to the line or strand wires in the subsequent operation of the machine;

Figure 9 is a vertical sectional view of the feeding and guiding means, through and by which the said tie or stay forming wires are intermittently fed into the machine, the section being on a line, generally indicated at 9—9 in Figure 4;

Figures 10 and 11 are a sectional view and a face view, respectively, of a section of the timing shaft with the compound cam driven thereby to actuate the cutting and pressing or guiding devices for the stay wires to be twisted, Figure 10 being a section on the line 10—10 of Figure 11;

Figure 12 is a similar face view, corresponding to Figure 11, but showing the compound cam in relatively different position;

Figure 13 is a top view of a pair of associated stay wires and guide blocks, with parts broken away, to more particularly illustrate the relation of one of the guide tubes with the guide block in which said tube terminates and at the end of which said guide block the stay wire is cut;

Figure 14 is an edge view of a pair of guide blocks illustrated in Figure 13, the supporting bed therefor being shown in vertical section;

Figure 15 is a detail perspective view of one of the hardened metal shear plates for the wire from which the stay wire is cut, this metal shear plate being adapted to cooperate with the cutter for that purpose, and the same being illustrated in plan in Figure 13 and in side elevation in Figure 14;

Figure 16 is a transverse sectional view through a series of strands or line wires associated with the stay or tie wires, intertwisted with respect to each other and about the strands or line wires, in keeping with the objects of the present invention, intermediate portions being broken away (it being understood that the stay wire lengths may be of any width desired);

Figure 17 is a face view of a fragment of completed fencing as illustrated in Figure 16;

Figure 18 is a detail edge view looking in the direction of the arrows on the line 18—18 of Figure 17, that is, from a direction opposite the edge or section as illustrated in Figure 16;

Figures 19, 20, 21, 22, 23, and 24 are companion top and side elevations, with parts in section, illustrative of the operations pursued in twisting the adjoining ends of stay or tie wires together and around the strand or line wires;

Figure 25 is a set of detail illustrations comprising a top, and opposite side views, of one of the twister heads;

Figure 26 is a vertical section, longitudinally of the machine, looking in the direction of the arrows and on the line 26—26, as designated in Figure 2, illustrating the stay wire cutter and pressers or guides which are adapted to sever the stay wires and thence force the wires into operative association with the twister head, related operating mechanisms being also illustrated in this view;

Figure 27 is a side elevation of the cam device for obtaining the proper sequence of operations of the cutter and pressing or guide members; and Figure 28 is a view similar to Figure 26 showing the positioning of the stay wires under the influence of the guide or pressing members after the cutter has preliminarily performed its work and said presser or guide members have insured the seating of the wires in the groove or space between the projections or fingers of the twister head all in readiness for the twisting operation and withdrawal of the guide or presser members.

Referring more specifically to the drawings, wherein like reference characters designate the same parts in the several views, 29 and 30 are suitably spaced upright metal frame members quite similar in character and constituting the opposite sides of the machine (as represented in Figures 1, 2 and 3). These frame members are connected together by cross-beams 31 and 32 at the front and rear ends of the frame members, including an intermediate cross-beam or bed frame member 33 also at the front, and a tie rod 34 at the top of the frame members 31 and 32. It will be understood that any number of tie rods or the like may be employed that may be found necessary to give the frame work adequate rigidity and stability when associated with the various parts mounted in and bridging the space between these side frame members, including a primary or timing shaft 35, the crimper roll shaft 36 and idler roll shafts 37, 38, and 39. The line or strand wires and the tie or stay wires intended to be secured together in fabricating the fencing desired to be produced by the present invention are conveniently introduced into the machine at right angles to each other, the strand or line wires being preferably fed into the machine from the front thereof and the tie or stay wires from one side of the machine. This feeding of the various wires as well as the operations thereof, including the connecting of the same together, is in a somewhat exposed location at the forepart of the machine; and to facilitate such operation and control, a platform 40 (conventionally indicated in Figure 1) is provided for the operator, the same being somewhat elevated. The line wires, designated 41, are drawn into the machine from ordinary spools or reels constituting the source of supply (not shown), as is the practice in fence-making machinery. The line wires 41 are passed around sheaves or pulleys 42 pivotally mounted on or with a cross-shaft 43 also mounted in the side frame members 29 and 30. From these pulleys or sheaves 42 the line wires pass, preferably in a true vertical plane, upwardly at the front of the machine and through and beyond the twisting station generally represented at A (Figure 1), from which station the completed fence fabric B (Figure 2) continues upwardly in said vertical plane to pass around, first, the idler roll 43, whose periphery is in true alignment with the twisters to be later specifically defined, thence downwardly and around the compensating or pull-up drum or roll 44, upwardly and around the second idler roll 45, from which the fabric moves downwardly and around the crimper roll 46 (of any suitable construction, not shown in detail herein because of its commonly known character), and finally the fabric passes upwardly and around the third idler roll 47 and is drawn toward the wrapper roll 48 at the rear of the machine, where the completed fencing is rolled up in spool formation ready for storage or shipment in ordinary fashion; all of this movement being aided by the continuous rolling and wrapping of the fabric by the wrapper roll 48, which is provided with a driving gear 49 in mesh with a pinion 50 actuated by the belt drive 51 passing around a pulley 52 connected to the pinion 50 and around a pulley 53 driven by the timing shaft 35.

Any type of belt tightener, such as conventionally illustrated at 54, may be resorted to, the same together with the wrapper roll and its associated operating instrumentalities being mounted on and supported by a supplemental frame work, represented at C (Figures 1 and 3).

While there is, as stated, a continuous wrapping or drawing action on the completed fence fabric towards the wrapper roll 48, the compensating or pull-up drum or roll 44 will, by its rise and fall, as hereinafter pointed out, permit a lull in the movement of the line or strand wires 41 at the front of the machine to allow the twisting operation, and following the twisting operation pull into the machine the additional length of line wires and correspondingly advance the completed fabric from the twisting station for the succeeding operation of applying the stays or tie wires to said line wires.

It is well at this point to observe that the timing shaft 35, which controls and effects the timing of the various operations of the elements of the machine, receives its power from a motor (preferably electric) D (Figure 3), on the shaft of which is a pulley 55 from which passes a driving belt 56 engaging a pulley 57, on the shaft 58 of which is a pinion 59 (Figure 2) engaging a large gear wheel 60 keyed to the timing shaft 35, so that during the operation of the machine this timing shaft becomes a continuously driven shaft controlled merely by a clutch 61 of any convenient type and operated in any suitable manner under the control of the operator at the forward end of the machine,—a well-known expedient in this art.

On the main drive shaft 58 there is also a pinion 62 which meshes with a pinion 63 on what may be styled a twister-gear shaft 64, which in operation, is also a continuously rotating shaft. Within the operating area or space between the side frames 29 and 30, the shaft 64 is provided with a plurality of worm gears 65 (Figures 4 and 26) adapted to engage corresponding worm gears 66 (Figures 2 and 26) keyed to and adapted to rotate the spindles of twisting or twister heads. The number of sets of this gear mechanism and spindles is, of course, optional and may be varied, in keeping with the size or character of the wire fencing to be produced; and while a substantial gang of these twisters is depicted in the present machine, they may be of less number, or even of greater number, as conditions or requirements may dictate.

The course of travel of the strand or line wires 41 being understood, the feed and course of travel of the stay or tie wires will now be considered.

At one side of the machine, more specifically the right-hand side of the machine, viewed from the front or operator's platform 40 thereof and suitably supported on a framework E, a combined feed and guide mechanism for the tie or stay wires, designated F (Figures 2 and 4), is provided. Any desired number of guide and feeding devices may be resorted to. Referring to Figures 2, 3, 4, and 9, it will be seen that the device immediately under consideration comprises a feeder box or housing 67 provided with opposite aligned series of guide tubes 68 and 69, the arrangement of the series being on an incline (Figure 3) corresponding to a plurality of grooved feeding rollers 70 mounted on a driven shaft 71 axially disposed transversely to the line of feed of the stay wires F. Associated with each of the feeding rollers is a spring pressure roller 72 operating to confine the stay wire in the groove and create a strong frictional binding action on the wire so as to force the same to advance when the feeding means is actuated. It will be observed that the twisting stations A being aligned, as illustrated in Figure 5, that is, some near and others remote to the stay feeding and guiding mechanism, a given rotation of the feeding rollers 70 must effect progressively increasing advances of the stay wires F so as to supply the stay wires to their allocated positions determined by said stations A. This is the reason for the progressive difference in size of the feed rollers 70 (as seen in Figures 4 and 9); and inasmuch as this feature of the machine is old in the art, no further discussions thereof will be necessary, save to the extent of alluding to the fact that the guide tubes 69 lead inwardly of the machine respectively to its guide block 73 adjacent the twisting station A, the improved characteristics of which will be pointed out.

The grooved feed rollers 70, keyed or otherwise secured to their shaft 71, will, dependent upon the traverse of the line wires and/or twisted fabric in the machine, have an intermittent actuation through the medium of a gear 74 connected by means of an interposed gear 75 with the gear 76 adapted to be turned by a rocking lever or member 77 free to pivot on the shaft 78 of the gear 76. The rocking member 77 has forward and rearward extensions projecting in opposite directions beyond the shaft 78 (as shown in Figures 2 and 8), and in the rear extension thereof a spring-pressed pawl 80 is mounted and adapted to engage a ratchet 81 to turn the same and gear 76, with resultant rotation of the grooved pulleys 70, when the forward end of the lever 77 is rocked in a downward direction, the pawl 80 riding over the rounded faces of the ratchet 81 and creating a corresponding lull in the feeding means when said inner end of the rocking lever 77 moves upwardly.

The foregoing, constituting the immediate means for intermittently operating the feeding means for the stay wires, it remains to define the actuating means for the rocking lever 77. This comprises a link 82 which may be appropriately styled "self-adjustable", that is, with reference to accommodating itself to a movement starting with a rotary driven element and terminating in the rocking movement of the member 77. With this in mind, the link 82 is connected by a universal joint 83 with the inner end of the member 77 and at its opposite or lower end is similarly connected for universal movement, as at 84, through a crank or pin 85 to an extended portion of the timing shaft 35; the universal action at this point of connection being constituted by the pivoting of a block 86 on the crank or pin 85 and in turn pivoting the block in the open end portion 87 constituting the lower end of the link connection 82 (as seen in Figure 3).

Now, assuming that stay wires have been fed transversely into the twisting or fabricating area or zone of the machine, in the progressive relationship shown in Figure 5, that is with the stay wire, for example as indicated at $f$, which is to be severed at the twisting zone A, passed through its appropriate guide block 73, and the end of the companion stay wire $f'$ that has previously been severed abutting the end face of a companion guide block 88, a pair of stay or tie wires are thus in position for treatment at the twisting zone. The bridging of the twisting zone by a companion stay wire (as thus illustrated in Figure 5) is in accurate relationship to the twisting heads 89 associated with the hollow spindles 90, previously alluded to, but specifically arranged and constructed as follows:

Referring particularly to Figure 26, wherein the cross-beam or bed 33, connecting the side frames 29 and 30, is illustrated in cross-section, it will be seen that the cross-beam for each spindle has a bore 91 with suitable bearings, 92 at the top and 93 at the bottom of said bore, for the spindle. The twisting head 89 has threaded engagement with the spindle 90, as indicated at 94, for purposes of removal and replacement, a washer 95 being interposed between the enlarged head portion of the twister and the bearing 92 so that the spindle cannot drop out of its supporting relationship with the beam 33, conditions otherwise permitting such dropping out or removal of the spindle. Each spindle is driven, as heretofore pointed out, by means of cooperating worm gears, one of which (66) is keyed to the spindle at $66x$ (Figure 26), the oppositely extended or sleeve portions of this gear bearing at the upper end against the bearing 93 and at its lower end against a similar bearing 96 carried by a removable frame member 97. Normally, the gear 66 is, in addition to its sliding engagement with the spindle 90 fastened thereto by a set screw 98 so as not to fall from the spindle when the frame member 97 has been removed. In Figure 2 of the drawings, it will be seen that the gang of twisters is divided into a number of series, the purpose being to afford access, as occasion may require, to a few of the spindles in disregard of the remaining spindles. This is accomplished by having the frame member 97 in relatively short sections or lengths and independently removable by releasing the bolts 99 normally securing the same in place and to the cross-beam 33, a series of interconnecting spacers 100 being interposed therebetween.

In view of the fact that certain parts of the mechanism, including cutters, guiding or pressing means, etc., are located above the twisting heads and in adjacence thereto, or for other reasons, it may be impractical to remove the spindles from their supporting means in an upward direction, all difficulties being overcome by the construction just described, which permits the removal of any spindle, for repair or the like, in a direction downwardly through the cross-beam 33 and independently of other spindles. This may be accomplished by removing a section of the frame member 97, loosening and removing the twister head 89 and supporting washer 95, when the spindle 90 may be withdrawn from the machine in a downward direction or in a direction opposite to the path of travel of the line wires 41 through the spindle and its head, said spindle and head, of course, being hollow or provided with line wire passages for the accommodation of said wire and the locating of the upwardly protruding portion of the wire centrally of the twister head, as is usual in these twisting operations. When the spindle has been thus removed, the gear 66 may be freed therefrom by simply loosening the binding screw 98 and slipping the gear from the spline 66x interconnecting the gear with the spindle. It will be appreciated that access being desired to one of the twisters, the section of the supporting frame 97 complemental to the particular series of spindles is removed, thereby freeing the lower ends of all of the spindles of the series, when the detaching of the twisting head and release of the supporting washer 95 will permit withdrawal of the particular spindle desired, while at the same time the operative status of the remaining twisters of the series will be preserved, because of the supporting effect of the binding screw 98 preventing fall of the worm gear 66 from the spindle, and the washer 95 preventing fall of the spindle from the supporting crossbeam 33.

The strand or line wires having been passed through the aligned hollow spindles and twisting heads in sufficient number to correspond to the line wires to be present in the ultimate fencing, and the stay wires having been projected through and against the appropriate guides adjacent the twisting stations, the next performance of the machine is to bring the wires that are to be connected into accurate relationship for twisting. The terminal portion of the wire f' is ready to be depressed while the terminal f must be severed from the body of the wire F, and to this end a shear plate 101 is detachably secured to the end of the guide block 73 that is disposed towards the twisting area. This shear plate or blade is of angle formation (Figure 15) to provide a wire seat 102 in the angle thereof for the wire portion f and an aperture 103 for the passage of the securing screw 104 suitably threaded into said end of the guide block 73. The guide block 73 has a passage therethrough into which the end of the guide tube 69 fits (Figure 13) and is held by a binding screw 105, and also receives a hollow tapered centering bearing 106 to position the portion of the stay wire f to be severed in the angle 102 of the shear plate or blade 101, a cutter 107 (Figure 26), operable at the appropriate time and by means to be defined, cooperating with this shear plate or blade 101 to sever the stay wire f and free the same for subsequent pressing or guiding down to the adjacent twister head 89.

The companion guide block 88, (like the guide block 73, is preferably bolted through the crossbeam or support 33, as at 88x and 73x) is located in abutting relationship to the back of the guide block 73. The guide block 88 is provided with a stepped recess, the deeper portion 108 of which is shaped to receive and accommodate the extended stay wire portion f', while the upper portion 109 thereof receives the flanged end 110 of a spring-pressed cover member or plate 111, whereby to confine the stay wire portion f', it being noted that the width of the flange is sufficient to overlie the deeper portion 108 of the recess and stay wire therein, and that the rear wall of the guide block 73 and corresponding rear edge of the shear plate or blade 101 in effect constitute a wall of the groove or recess in which the wire portion f' is seated and retained. The reason for having a spring-pressed member yieldable for normally closing the wire recess is to enable the wire to be forcibly withdrawn by an upward movement, thereby forcing back the said member incident to the progressive travel of completely twisted portions of the fencing out of the way to allow for the introduction of the succeeding stay wire to be introduced into the recess 108. This general principle is prevalent in the art, but the formation and arrangement of the present associated guide blocks and character of yieldable closure is believed to be new. The yieldable pressure of the closure member 111 is obtained by means of a spring 112 which may be of a strength in keeping with the character of the wires or fencing being operated on, the force required for advancing the fencing in the course of such operation, etc. The rectilineal line of travel of the fencing as it advances in the machine, thereby pulling the stay wire f' upwardly out of the guide blocks 88 and correspondingly forcing back the cover plate 111 against the closing action of its spring, is indicated by the vertical dot-and-dash lines (Figure 14).

The cutters 107 which, as stated, cooperate with the shear plates or blades 101 on the guide blocks 73 are each mounted to be swung into and out of operating position by a curved arm 113 keyed to a shaft 114 at opposite ends in brackets 115 near the ends of the supporting beam 33 (Figures 4 and 28). The cutters are adjustably mounted in tool holders 116 at the free end of the curved arms 113. There is one of these curved arms 113 for each cutting tool and they are all operated in unison and in like manner by the partial rotation of the said shaft 114, accomplished by the actuation of similarly curved arms 117 near the opposite sides of the machine and corresponding ends of the shaft 114. The free end of each arm 117 is provided with a transverse pivot pin 118 carrying an anti-friction roller 119 adapted to work in a cam slot 120 formed in a cam plate 121 adjustably mounted on the bracket 122 projecting inwardly from the side frame members 29 and 30 (Figures 2 and 4). The anti-friction roller 119 is adapted to be moved substantially upwardly and downwardly in the cam slot 120 by an operating arm or pitman member 123 (Figures 26 and 28), as will be presently pointed out in connection with the pressing or guiding members for the wire portions f, f' to guide and position the same with reference to the twister heads 89, inasmuch as the operating arm 123 and its actuating means also serves as the operating means for the stay wire guiding or presser members.

Directly above the twisters 89 and parallel to a line drawn through the gang of twisters, a carrier is disposed transversely of the machine and comprises outwardly-facing angle beams 124 spaced apart by slide members 125 interposed therebetween and bolted thereto at 126, the slides in turn being workable up and down in ways 127 on the opposite side frame members 29 and 30 (as best seen in Figure 2), and the lower ends of these slide members 125 being pivotally connected at 128 to a small slotted opening located at the adjacent end of the adjoining cam plate 121 so as to move adjustably therewith, the opposite end of the cam plate being held in a predetermined adjustable position by a suitable bolt connection 129, the ways 127 and connection 128 permitting pivoting of the cam plate 121 to the extent necessary for the purpose to be presently pointed out.

Two of the guide and presser members, constituting a pair, devoted to any given twisters, are represented at 130, the same being adjustably mounted in tool holders 131 secured to the spaced carrier members 124 and arranged to cause convergence of the guiding and pressing tools 130 in a downward direction while providing for the spaced separation of the tools transversely of the bed of the machine, to locate one such tool alternately of or at each side of a twisting head 89. The tools fixed to the carrier and the carrier having a vertical movement axially in line with the twisting heads will insure accurate positioning and operation of the parts when effecting engagement of the wires to be twisted with the twister heads. Now, the effect of the arrangement of cutters and guiding or pressing elements or tools is that,—assuming the parts to be in the inoperative position illustrated in Figure 26,—a pulling down of the actuating arm 123 will cause the roller 119 to travel down the substantially straight and inclined portion of the cam slot 120, correspondingly lowering the free end of the arm 117, turning the shaft 114, and swinging the cutter downwardly and inwardly to cooperate with the shear plate 101 in severing the stay wire $f$. This freeing or severing of the stay wire leaves adjacent terminal ends of stay wires $f$ and $f'$ in position to be forced convergingly downwardly to and in engagement with the twister head 89. This guiding and pressing of the terminal portions of the stay or tie wires downwardly into cooperative relationship with the twister head is accomplished by the lowering of the guiding and presser tools 130 coincident with the lowering of the spaced carrier member 124, the latter being drawn downwardly by the further movement of the roller 119 in the relatively offset or arcuate portion 120$x$ of the cam slot 120 to which the beforementioned inclined cam portion 120 leads, at which time the roller 119 being no longer permitted to descend irrespective of the cam plate 121 must carry downwardly therewith said cam plate, the carrier 124, and tools 130, all in keeping with the continued drawing or pulling action of the operating arm or link 123. The resultant action of the guiding and pressing tools 130 is clearly shown in Figure 27, where it will be seen that the terminal portions $f$, $f'$ of stay wires have been caused to enter the slot or opening 89$x$ of the twister head 89 (Figure 25), and the latter being a continuously rotating element will thereupon cause the intertwisting of the stay wires together and to the strands or line wires 41 by the sequence of operations outlined in Figures 19 to 24, inclusive, the fabricated product being the hinged type of fencing illustrated in Figures 16 to 18, inclusive, the particular form of which is, of course, recognized as old in the art. In reference to Figure 26, it will be seen that the completed fence fabric B in its vertical travel upwardly from the twisting mechanism passes between and through the spaced carrier members 124.

Considering the particular means for pulling down or raising the operating arm 123 as a unitary actuator to initially operate the cutters 107 and then the guide or presser tools or members 130, said arm 123 (by reference to Figures 10 to 12, inclusive) will be seen as provided with a so-called double cam arrangement, one cam being of a form to obtain the successive operations of the cutters and guide or presser tools in the movement of the operating arm 123 in a downward or pull direction, and the other cam to simultaneously retract the cutters, pressers, or guide tools, carrier 124, and associated parts, by a thrust or opposite and upward movement of the said operating arm 123.

With these observations in mind, it is pointed out that the end of the operating arm 123 is so constructed as to provide a cam box 132 having a cover 133 removably bolted thereto, as at 134, the bottom of the cam box and cover 133 having aligned slots 132$x$ and 133$x$ to permit the play of the box back and forth over the timing shaft 35 under the actuation of the cams within the box, and through which cams, box, and cover the timing shaft 35 passes. One cam 135, namely, the activating cam for the cutters 107 and guide or presser tools 130,—is keyed to the timing shaft 35, as shown at 136, and the other cam 137,—the retracting cam,—is mounted in facewise juxtaposition to the cam 135 and conveniently secured by the common key 136 to the timing shaft 35. The roller 138 is pivotally mounted on the bottom wall of the cam box at 139 in peripheral contact with the activating cam 135, and a similar roller 140 is mounted between the top surface of the box and the cover 133 in peripheral engagement with its associated cam 137.

It will be understood, of course, that throughout this specification, wherein gears, bearings, cutters, pressers, rollers, and cams, and the like are referred to, said parts are formed preferably of hardened steel or material capable of performing the various functions attributable thereto, as will be appreciated by those familiar with the making of wire fencing, or as may be required by conditions to be met in the building and operation of the machine herein particularly under consideration.

The arrangement of the cams 135 and 137 in reference to the timing shaft 35 and the operating member or pitman 123 is such that the movement of these parts and the resultant effect on the cutters and presser or guide tools will be in the required relationship to the other operating parts of the machine. When the cam 135 rotates in the direction indicated by the arrow (Figures 11 and 12), the same contacting its companion roller 132 will draw downwardly upon the operating member 123, correspondingly pulling down the end of the cutter lever or operating arm 117 to effect cutting of the stay wire $f$, correspondingly moving the roller 119 downwardly in the cam slot 120; and by reason of the entry of the roller 119 into engagement with the offset or arcuate portion 120$x$ of the cam slot, the cam plate 121 and carrier 124, together with the guiding and pressing tools 130, will quickly and positively position the stay wires $f$ and $f'$ with respect to the twister 89, as has already been described.

The operation of the compensating or pull-up drum or roll 44 is obtained by keying the same to the timing shaft 35 at 141 (Figures 6 and 7), a pair of somewhat different eccentrics or cams 142, either of which may be employed, as conditions or adjustment may demand, to be received into the two-part detachable eccentric strap 143 carrying a pitman or link 144 detachably connected at its opposite end with a lug 145 or bolts 146 projecting from a loose collar 147 on the shaft 147x of the pull-up drum 44, the collar being arranged between one end of the drum and the slide block 148 arranged to move up and down in a guideway 149 in the side frame member 29 (Figure 1), it being understood that the arrangement is duplicated at the opposite side of the machine, that is in connection with the side frame 30.

Although it is probably unnecessary to so state, it will be recalled that this duplication of mechanism at the opposite sides of the machine is also true of the actuating means (cam plate 121, etc.) (cam box 132, compound cams 135—137, etc.) for the cutting and pressing or guiding tools previously referred to.

From the arrangement just described, it will be seen that coincident with the rotation of the timing shaft 35, the cam 142 through the strap 143, pitman or link 144, and connection with the shaft 147x of the pull-up drum 44 will create an up-and-down movement of said drum as governed by the slide block 148 and guideway 149. However, when the extent of up-and-down movement of the drum 44 is to be varied, it is simply necessary to remove the pitman 144 from its attachment with the lug 145, disconnecting the strap 143 from the eccentric 142, bolt the strap 144 to the opposite side of the lug 145, and secure the strap 143 around the different associated eccentric 150. This alternative arrangement is indicated by dotted lines in Figure 7. For example, this alternative utilization of the varied cams 142 and 150 will be useful in operating the pull-up drum or roll 44 to accommodate for corresponding spacing of the stay or tie wires, as for instance, in forming the spacing of the stay wires, say six inches apart, or in another instance with the stay wires say ten or twelve inches apart, as manufacturing conditions may require.

As suggested in the forepart of this specification, the crimping roll 46 may be of any approved or arbitrary design or character, it sufficing herein to note that the same receives its driving power from the pulley 53 on one end of the timing shaft 35 which in turn rotates a pinion 151 located just inside of said pulley 53 on said end of the timing shaft 35 (see Figure 2) and intermeshes with a large gear wheel 152 on an end of the crimper shaft 36 (Figure 1), as compared to the relative freedom of movement of the fence fabric around the idler rolls 43, 45, and 47, and because of the relative binding action of the fabric in passing around the crimping roll 46 and receiving its customary treatment thereby, coupled with the fact that this crimping roll is a positively rotated element, the same serves additionally and in helpful relation to the driven winding roll 48 to draw the fabric through the machine and keep the same taut and in continuous movement following its passage from the compensating or pull-up drum 44. The latter, permitting sufficient lull in the movement of the wires being operated on at the twisting zones or stations A, so as to complete the twisting operation while the wires and fabric in advance thereof are stationary, coupled with the fact that the travel of the fabricated material upwardly from the twisting zone is in a truly vertical path, all a cooperating influence in insuring accurate relationship of the wires being connected together and in preventing disturbance and undue friction of such wires at the twisting zones, as so frequently occurs where inclined or vibrating paths of travel are resorted to, and corresponding bending, inclining, or sagging of the fabric, and vibration of the wires occurs in the region of the positioning or pressing guides or tools and twisting heads, where said wires should be maintained in as quiet and fixed relationship as possible.

While we have herein disclosed the preferred embodiment of our invention, demonstrated to be practical, speedy, comparatively simple, compact, and altogether efficient in operation, it will be readily apparent that the invention is equally capable of embodiment in other forms and arrangements of parts, as will be included within the terms and scope of the hereto-appended claims.

We claim:

1. The combination with line wire feeding means, of feeding means for stay wire, including a guide block to position a part of the stay wire near the line wire, and means for severing a part of the stay wire to provide a stay and liberate the same from the remainder of the stay wire, comprising a cutter and a cooperating shearing angle plate mounted adjacent an end face of the guide block in position to receive and support the wire in the angle thereof and oppose the cutter thereat.

2. The combination with line wire feeding means, of feeding means for stay wire, including a guide block to position a part of the stay wire near the line wire, and means for severing a part of the stay wire to provide a stay and liberate the same from the remainder of the stay wire, comprising a cutter and a cooperating shearing plate arranged adjacent an end face of the guide block in position to receive and support the wire in a part thereof, and means removable outwardly from the shear plate to permit detachment thereof.

3. The combination with line wire feeding means, of feeding means for stay wire, including a guide block to position a part of the stay wire near the line wire, and means for severing a part of the stay wire to provide a stay and liberate the same from the remainder of the stay wire, comprising a cutter and a cooperating shearing angle plate arranged adjacent an end face of the guide block in position to receive and support the wire in the angle thereof and oppose the cutter thereat, and means for detachably supporting the shear plate in operative position with reference to the guide block.

4. The combination of a pair of guide blocks for stay wires and through which the stay wires may project, one of said blocks being provided with a shear plate at one end thereof adapted to cooperate with a cutter, and the other guide block having a recess for the reception of its wire, and a yieldable closure having a flange entering said recess to confine the wire until forcibly withdrawn.

5. The combination of a pair of guide blocks for stay wires and through which the stay wires may project, one of said blocks being provided with a shear plate at one end thereof adapted to cooperate with a cutter, and the other guide block having a recess for the reception of its wire, and a yieldable closure having a flange entering said recess to confine the wire until forcibly withdrawn, the adjacent inner wall of said first mentioned guide block and edge of the shear plate constituting an outer wall of said recess.

6. The combination of a pair of guide blocks for stay wires and through which the stay wires may project, one of said blocks being provided with means adapted to cooperate with a cutter, and the other guide block having a recess for the reception of its wire, and a yieldable closure having a flange entering said recess to confine the wire until forcibly withdrawn, the adjacent wall of said first mentioned guide block constituting an outer wall of said recess.

7. The combination of a pair of guide blocks for stay wires and through which the stay wires may project, one of said blocks being provided with means adapted to cooperate with a cutter, and the other guide block having a recess for the reception of its wire, and a yieldable closure having a flange entering said recess to confine the wire until forcibly withdrawn, the adjacent wall of said first mentioned guide block constituting an outer wall of said recess, the recess being of stepped formation and the deeper portion thereof being adapted to accommodate the wire and the remaining portion thereof to accommodate the flange of the yieldable closure with the end of the latter overlying said deeper portion.

8. In a machine of the character described, a guide block for stay wires provided with a stepped recess for the reception of a wire, a yieldable closure having a flange also adapted to be received in said recess to confine the wire until forcibly withdrawn, the deeper portion of the recess being adapted to accommodate the wire and the remaining portion thereof being adapted to accommodate the flange of the yieldable closure with the end of the latter overlying said deeper portion.

9. In a machine of the character described, feeding and guiding means for stay wires, and means for effecting intermittent feeding of said wires, including a rocking member, and driving connections between the same and the feeding means to operate the latter when the rocking member is moved in one direction and to permit a lull in the feeding means when rocked in an opposite direction, and actuating means for said rocking member.

10. In a machine of the character described, feeding and guiding means for stay wires, and means for effecting intermittent feeding of said wires, including a rocking member, and driving connections between the same and the feeding means to operate the latter when the rocking member is moved in one direction and to permit a lull in the feeding means when rocked in an opposite direction, and actuating means for said rocking member, said actuating means including a rotatable drive element and self adjusting connections between said drive element and the rocking member to impart to the latter a to and fro movement.

11. In a machine of the character described, feeding and guiding means for stay wires, and means for effecting intermittent feeding of said wires, including a rocking member, and driving connections between the same and the feeding means to operate the latter when the rocking member is moved in one direction and to permit a lull in the feeding means when rocked in an opposite direction, and actuating means for said rocking member, said actuating means including a rotatable crank element and a connecting link element universally associated with said crank and the rocking member to translate the rotary movement of the crank into a back and forth movement of the rocking member.

12. In a machine of the character described, feeding and guiding means for stay wires, and means for effecting intermittent feeding of said wires, including a rocking member pivotally mounted intermediate of its ends, driving connections between one end of said rocking member and the feeding means, including cooperatively related gearing and pawl and ratchet mechanism, to operate the feeding means when the rocking member is moved in one direction and to permit a lull in the feeding means when rocked in an opposite direction, and actuating means associated with the other end of the rocking member.

13. In a machine of the character described, feeding and guiding means for stay wires, and means for effecting intermittent feeding of said wires, including a rocking member pivotally mounted intermediate of its ends, driving connections between one end of said rocking member and the feeding means, including cooperatively related gearing and pawl and ratchet mechanism, to operate the feeding means when the rocking member is moved in one direction and to permit a lull in the feeding means when rocked in an opposite direction, and actuating means associated with the other end of the rocking member, said actuating means including a rotatable drive, and self adjusting connections between said drive element and said last mentioned end of the rocking member whereby the rotary movement of the drive element is translated into a back and forth movement of the rocking member.

14. In a machine of the character described, a twister for wires including a hollow spindle, a supporting frame and bearings for the spindle, a correspondingly hollow twister head carried by said spindle, means for rotating said spindle and head, positioning means for the wires disposed longitudinally of the spindle and in adjacence to the twisting head, the parts being formed and arranged to permit the withdrawal of the spindle from the supporting means, when the twister head is detached from the spindle, by a retracting movement away from said positioning means whereby to avoid the latter.

15. In a machine of the character described, a twister for wires including a spindle, a twister head detachably connected therewith, supporting and bearing means for the spindle, means interposed between the twister head and a part of the supporting and bearing means to normally prevent withdrawal of the spindle, driving means for the spindle, the parts being formed and arranged to permit the withdrawal of the spindle when the twister head is detached from the spindle.

16. In a machine of the character described, a twister for wires including a spindle, a supporting frame and bearings therefor, a twister head carried by said spindle, a part of the frame and bearing portion thereof at the end of the spindle opposite to the head end of the same being removable from the spindle to permit retraction of the latter when the twister head is detached from the spindle.

17. In a machine of the character described, a twister for wires including a spindle, a supporting frame and bearings therefor, a twister head carried by said spindle, a part of the frame and bearing portion thereof at the end of the spindle opposite to the head end of the same being removable from the spindle to permit retraction of the latter when the twister head is detached from the spindle, and driving means for the spindle including a gear on the spindle normally located above said removable portion of the frame and bearing.

18. In a machine of the character described, a twister for wires including a spindle, a supporting frame and bearings therefor, a twister head carried by said spindle, a part of the frame and bearing portion thereof at the end of the spindle opposite to the head end of the same being removable from the spindle to permit retraction of the latter when the twister head is detached from the spindle, and driving means for the spindle including a gear on the spindle normally located above said removable portion of the frame and bearing, the ends of the gear being adapted to bear against adjacent ends of opposite portions of the spindle bearings.

19. In a machine of the character described, twisters for wires including spindles arranged in parallel series, supporting and bearing means for said series, including a frame member in engagement with one end of each of the spindles and removable to permit withdrawal of any spindle desired in a direction toward the normal position of said frame member when the twister of any spindle is detached therefrom.

20. In a machine of the character described, twisters for wires including spindles arranged in parallel series, supporting and bearing means for said series, including a frame member in engagement with one end of each of the spindles and removable to permit withdrawal of any spindle desired in a direction toward the normal position of said frame member when the twister of any spindle is detached therefrom, in combination with means for retaining any spindle in normal position while any other spindle is withdrawn.

21. In a machine of the character described, a twister for wires including a hollow spindle, a supporting frame and bearings for the spindle, a corresponding twister head carried by said spindle, means for effecting travel of a wire through said spindle and head in the direction of said head, the parts being formed and arranged to permit removal of the spindle by a withdrawing movement opposite to that of the direction of travel of the wire when the twister head is detached from the spindle.

22. In a machine of the character described, a gang of twisters for wires arranged in a plurality of series, each comprising parallel spindles provided with twister heads, supporting and bearing means for all of the spindles, the supporting means being in parts complemental to the several series of the gang of twisters, and means whereby any one of said complemental parts of the supporting means may be removed to liberate its series of spindles so that any one or all of said series may be withdrawn.

23. In a machine of the character described, the combination of a twisting head, guiding means for stay wires and associated cutting means to enable terminal portions of the wires to be presented to the twisting head, pressing means movable in a substantially rectilineal path to force said terminal portions into operative association with the twisting head, and actuating means common to both the cutting and pressing means.

24. In a machine of the character described, the combination of a twisting head, guiding means for stay wires and associated cutting means to enable terminal portions of the wires to be presented to the twisting head, pressing means movable in a substantially rectilineal path to force said terminal portions into operative association with the twisting head, and actuating means common to both the cutting and pressing means formed and adapted to sequentially operate the cutting means and the pressing means.

25. In a machine of the character described, the combination of a twisting head, guiding means for stay wires and associated cutting means to enable terminal portions of the wires to be presented to the twisting head, pressing means movable in a substantially rectilineal path to force said terminal portions into operative association with the twisting head comprising a carrier disposed transversely of the twisting head movable towards and from the latter and oppositely related presser members converging inwardly from the opposite sides of the carrier towards said twisting head, and actuating means common to both the cutting and pressing means.

26. In a machine of the character described, the combination of a twisting head, guiding means for stay wires and associated cutting means to enable terminal portions of the wires to be presented to the twisting head, pressing means movable in a substantially rectilineal path to force said terminal portions into operative association with the twisting head comprising a carrier disposed transversely of the twisting head movable towards and from the latter and oppositely related presser members converging inwardly from the opposite sides of the carrier towards said twisting head, and actuating means common to both the cutting and pressing means formed and adapted to sequentially operate the cutting means and the pressing means.

27. In a machine of the character described, in combination with a twister head for associated wire portions, of presser means for positioning said wire portions into operative position with said head and means for moving the presser means in a substantially rectilineal path.

28. In a machine of the character described, in combination with a twister head for associated wire portions, of presser means for positioning said wire portions into operative position with said head and means for moving the presser means in a substantially rectilineal path approximately aligned with the twister head.

29. In a machine of the character described, in combination with a twister head for associated wire portions, of presser means for positioning said wire portions into operative position with said head and means for moving the presser means in a substantially rectilineal path approximately aligned with the twister head, said presser means including a carrier movable towards and from the twister head and pressing members mounted on the carrier occupying a converging relation with respect to the twister head.

30. In a machine of the character described, in combination with a twister head for associated wire portions, of presser means for positioning said wire portions into operative position with said head and means for moving the presser means in a substantially rectilineal path approximately aligned with the twister head, said presser means including a carrier movable towards and from the twister head and pressing members mounted on the carrier and projecting therefrom towards said twister head.

31. In a machine of the character described, in combination with a twister head for associated wire portions, of presser means for positioning said wire portions into operative position with said head and means for moving the presser means in a substantially rectilineal path approximately aligned with the twister head, said presser means including a carrier movable towards and from the twister head and pressing members mounted on the carrier and projecting therefrom towards said twister head and means for adjusting the pressing members with respect to each other and with respect to the twister head.

32. In a machine of the character described, twisting means, and oppositely disposed positioning means for wires to locate the latter in operative relation to the twisting means, said positioning means being movable towards and from the twisting means, and a common carrier for both of said means by which to move the same as a unit.

33. In a machine of the character described, twisting means, and oppositely disposed positioning means for wires to locate the latter in operative relation to the twisting means, said positioning means being movable towards and from the twisting means, and a common carrier for both of said means by which to move the same as a unit and means for feeding the resultant twisted wiring outwardly between the oppositely disposed positioning means.

34. In a machine of the character described, twisting means, and substantially spaced oppositely disposed positioning means for wires to locate the latter in operative relation to the twisting means, said positioning means being movable towards and from the twisting means, and a common carrier for both of said means by which to move the same as a unit, said carrier having a passageway therethrough leading from the space between the oppositely disposed positioning means, and means for feeding the resultant twisted wiring outwardly between the oppositely disposed positioning means.

35. In a machine of the character described, twisting means, and substantially spaced oppositely disposed positioning means for wires to locate the latter in operative relation to the twisting means, said positioning means being movable towards and from the twisting means, and a common carrier for both of said means by which to move the same as a unit, said carrier having a passageway therethrough leading from the space between the oppositely disposed positioning means, and means for feeding the resultant twisted wiring outwardly between the oppositely disposed positioning means, said passageway in the carrier, spaced between the oppositely disposed positioning means and twisting means being aligned to permit said wiring to travel a continuous straight course.

36. In a machine of the character described, the combination with a twister head, fixedly related presser elements for positioning wires in operative relation with said head, a single carrier for said presser elements, and means for moving the carrier and elements approximately axially of the twister head.

37. In a machine of the character described, the combination with a twister head, fixedly related presser elements for positioning wires in operative relation with said head, a single carrier for said presser elements, and means for moving the carrier and elements approximately axially of the twister head comprising a pivoted plate loosely connected to the carrier and a cam operated link cooperatively associated with the plate to shift the same and carrier in opposite directions.

38. In a machine of the character described, the combination of a twister for wires, a pivoted cutter, an operating arm for the same, and means for actuating said arm including a cam operated link pivotally associated with the free end of said arm, the free end of said arm and the link connection therewith being disposed in a plane intersecting the plane of the axis of the twister.

39. In a machine of the character described, the combination of a twister for wires, a pivoted cutter, an operating arm for the same, and means for actuating said arm including a device operatively associated with the free end of said arm, the free end of said arm and its immediate operative association with the actuating means being disposed in a plane intersecting the plane of the axis of the twister.

40. In a machine of the character described, the combination with pivoted cutting means and rectilineally movable positioning means, of means for actuating the same, including a cam plate cooperatively related to the both said cutter and said means, including a device complemental to the cam plate, and means for shifting said device whereby in its initial movement the cutter will be operated and in its succeeding movement the positioning means will be operated.

41. In a machine of the character described, the combination with pivoted cutting means and rectilineally movable positioning means, of means for actuating the same, including a plate having a cam slot therein cooperatively related to the both said cutter and said means, including a roller complemental to the cam slot and traversing the same, and means for shifting said roller whereby in its initial movement within said slot the cutter will be operated and in its succeeding movement within said slot the positioning means will be operated.

42. In a machine of the character described, the combination with pivoted cutting means and rectilineally movable positioning means, of means for actuating the same, including a cam plate cooperatively related to the both said cutter and said means, including a device complemental to the cam plate, and means for shifting said device whereby in its initial movement the cutter will be operated and in its succeeding movement the positioning means will be operated, said last mentioned means including a link connection with said device and having its opposite end formed into a cam housing, and a compound cam mechanism therein, one element of which effects the operation of the cutter and positioning means and the other element of which causes them both to recede from operative position.

43. In a machine of the character described, the combination with pivoted cutting means and rectilineally movable positioning means, of means for actuating the same, including a plate having a cam slot therein cooperatively related to the both said cutter and said means, including a roller complemental to the cam slot and traversing the same, and means for shifting said roller whereby in its initial movement within said slot the cutter will be operated and in its succeeding movement within said slot the positioning means will be operated, said last mentioned means including a link connection with said roller and having its opposite end formed into a cam housing, and a compound cam mechanism therein, one element of which effects the operation of the cutter and positioning means and the other element of which causes them both to recede from operative position.

44. In a machine of the character described, wire treating elements, means for actuating the same including a cam operated link comprising a cam box secured to the remote end of the link, a cover for said box, the cover and opposite wall of the box having aligned slots, a driving shaft passing through said slots, a compound cam keyed to said shaft and confined within said box, and rollers supported by said box, one complemental to each cam element, one cam element and roller association being adapted to effect movement of the wire treating elements to operating position, and the other cam element and roller association being adapted to cause said wire treating elements to recede from operative position.

45. In a machine of the character described, wire treating elements, means for actuating the same including a cam operated link comprising a cam box secured to the remote end of the link, a cover for said box, the cover and opposite wall of the box having aligned slots, a driving shaft passing through said slots, a compound cam keyed to said shaft and confined within said box, and rollers supported by said box, one complemental to each cam element, one cam element and roller association being adapted to effect movement of the wire treating elements to operating position, and the other cam element and roller association being adapted to cause said wire treating elements to recede from operative position, one of the rollers being mounted on the bottom wall of the cam box and the other of said rollers being mounted between one end portion of said cam box and the cover of the box.

46. In a machine of the character described, a pull-up drum, slidable bearings therefor and means for shifting the drum with said bearings comprising a pitman pivotally related to the drum at one end of the pitman, the opposite end of the pitman being formed into a strap, and a driven eccentric within said strap to cooperate in elevating and lowering the drum.

47. The combination with a pull-up drum mounted in supports to permit raising and lowering of the drum, and means for effecting said raising and lowering of the drum formed and arranged to permit alternative extents of the raising and lowering movements of the drum.

48. The combination with a pull-up drum mounted in supports to permit raising and lowering of the drum, and means for effecting said raising and lowering of the drum formed and arranged to permit alternative extents of the raising and lowering movements of the drum, including driven eccentrics, a combined eccentric strap and link detachably associated with one of said eccentrics and operatively associated with the drum to effect rise and fall thereof as determined by said eccentric, said combined eccentric strap and link being capable of removal from its immediate eccentric and attachment to another of said driven eccentrics, and the operative association of the combined eccentric strap and link with the drum being adapted to permit the change from one eccentric to the other, whereby a correspondingly varied movement of the drum may be accomplished.

49. In a machine of the character described, line and stay wires twisting mechanism for fencing, a series of rolls for passage of the fencing therearound, means for drawing the fencing through said machine about said rolls, and means interposed between certain of said rolls in the line of travel of said fencing whereby movement of the fencing about certain of the rolls will be relatively continuous, and relatively intermittent as to a roll nearest the wire twisting mechanism.

50. In a machine of the character described, a supporting structure comprising side frames, line and stay wires twisting mechanism for fencing, a series of substantially parallel rolls mounted in a substantially common plane on said side frames near the top thereof, a pull-up roll located below said series of rolls, and means for drawing the fencing through the machine and around all of said rolls.

51. In a machine of the character described, a supporting structure comprising side frames, line and stay wires twisting mechanism for fencing, a series of substantially parallel rolls mounted in a substantially common plane on said side frames near the top thereof, a pull-up roll located below said series of rolls, and means for drawing the fencing through the machine and around all of said rolls, the combination with a driven crimper roll also located below said series of rolls facilitating the drawing of the fencing through the machine.

52. In a machine of the character described, a supporting structure comprising side frames, line and stay wires twisting mechanism for fencing, a series of substantially parallel rolls mounted in a substantially common plane on said side frames near the top thereof, a pull-up roll located below said series of rolls, the combination with a driven crimper roll also located below said series of rolls facilitating the drawing of the fencing through the machine, and a driven winding roll for the fencing also located in a plane below said series of rolls to draw the fencing downwardly and away from that roll of the series of rolls nearest thereto.

53. In a machine of the character described, a supporting structure comprising side frames, line and stay wires twisting mechanism for fencing, a series of substantially parallel rolls mounted in a substantially common plane on said side frames near the top thereof, a pull-up roll located below said series of rolls, and means for drawing the fencing through the machine and around all of said rolls, the combination with a driven crimper roll also located below said series of rolls facilitating the drawing of the fencing through the machine, the rolls in the lower planes with respect to the plane of the series of rolls being relatively positioned and in compact relationship to insure the various runs of the fencing from roll to roll being taut and approximately vertical.

54. In a machine of the character described, a supporting structure comprising side frames, line and stay wires twisting mechanism for fencing, a series of substantially parallel rolls mounted in a substantially common plane on said side frames near the top thereof, a pull-up roll located below said series of rolls, the combination with a driven crimper roll also located below said series of rolls facilitating the drawing of the fencing through the machine, and a driven winding roll for the fencing also located in a plane below said series of rolls to draw the fencing downwardly and away from that roll of the series of rolls nearest thereto, the rolls in the lower planes with respect to the plane of the series of rolls being relatively positioned and in compact relationship to insure the various runs of the fencing from roll to roll being taut and approximately vertical.

55. In a machine of the character described, a supporting structure comprising side frames, line and stay wires twisting mechanism for fencing, a series of substantially parallel rolls mounted in a substantially common plane on said side frames near the top thereof, a pull-up roll located below said series of rolls, and means for drawing the fencing through the machine and around all of said rolls, that roll of the series of rolls nearest the twisting mechanism being fixed in position thereabove with its periphery vertically aligned with the line of passage of the line wires through and from the twisting mechanism.

56. In a machine of the character described, a supporting structure comprising side frames, line and stay wires twisting mechanism for fencing, a series of rolls on the upper portion of said frames, a pull-up roll located in position below said rolls, and means for drawing the fencing through the machine around all of said rolls, that roll of the series of rolls nearest the twisting mechanism being fixed in position thereabove with its periphery vertically aligned with the line of passage of the line wires through and from the twisting mechanism.

57. In a machine of the character described, a supporting structure comprising side frames, line and stay wires twisting mechanism for fencing, a series of rolls on the upper portion of said frames, a pull-up roll located in position below said rolls, and means for drawing the fencing through the machine around all of said rolls, that roll of the series of rolls nearest the twisting mechanism being fixed in position thereabove with its periphery vertically aligned with the line of passage of the line wires through and from the twisting mechanism, the line of travel of the fencing between the twisting mechanism and said last mentioned roll being clear to permit vertical travel of the fencing without engagement and creating of deflection or vibration of the line wires at the wire twisting mechanism.

58. In a machine of the character described, a supporting structure comprising side frames, line and stay wires twisting mechanism for fencing, a series of rolls on the upper portion of said frames, a pull-up roll located in position below said rolls, and means for drawing the fencing through the machine around all of said rolls, that roll of the series of rolls nearest the twisting mechanism being fixed in position thereabove with its periphery vertically aligned with the line of passage of the line wires through and from the twisting mechanism, in combination with timing mechanism controlling the operation of the twisting mechanism, pull-up roll and means for drawing the fencing through the machine, whereby the winding of the completed fencing will be continuous at the discharge end of the machine and intermittent at the intake end of the machine to provide the lull in the travel of the wires when twisting and while the fencing between the twisting mechanism and the roll immediately thereabove is in relatively quiet or stationary state.

59. In a machine of the character described, a supporting structure comprising side frames, line and stay wires twisting mechanism for fencing, a series of rolls on the upper portion of said frames, a pull-up roll located in position below said rolls, and means for drawing the fencing through the machine around all of said rolls, that roll of the series of rolls nearest the twisting mechanism being fixed in position thereabove with its periphery vertically aligned with the line of passage of the line wires through and from the twisting mechanism, the line of travel of the fencing between the twisting mechanism and said last mentioned roll being clear to permit vertical travel of the fencing without engagement and creating of deflection or vibration of the line wires at the wire twisting mechanism, in combination with timing mechanism controlling the operation of the twisting mechanism, pull-up roll and means for drawing the fencing through the machine, whereby the winding of the completed fencing will be continuous at the discharge end of the machine and intermittent at the intake end of the machine to provide the lull in the travel of the wires when twisting and while the fencing between the twisting mechanism and the roll immediately thereabove is in relatively quiet or stationary state.

60. In a machine of the character described, a twister for wires including a spindle, a supporting frame and bearings for the spindle, a twister head carried by said spindle, means for rotating said spindle and head, positioning means for the wires disposed longitudinally of the spindle and in adjacence to the twister head, releasable retaining means to prevent withdrawal of the spindle, the parts being formed and arranged to permit withdrawal of the spindle from the supporting means when the retaining means is released, by a retracting movement away from said positioning means whereby to avoid the latter.

JOHN B. GETZ.
BENJAMIN E. GETZ.
JOHN H. LEADER.